United States Patent Office 3,484,527
Patented Dec. 16, 1969

3,484,527
SUBSTITUTED PHENOXYACETIC ACID DIETHYL-
AMIDES AS ANESTHETICS
Winfried Arnold, Dobbs Ferry, N.Y., and Charles J.
Morel, Arlesheim, Baselland, Switzerland; said Morel
assignor to Geigy Chemical Corporation, Greenburgh,
N.Y., a corporation of New York
No Drawing. Continuation of application Ser. No.
431,214, Feb. 8, 1965. This application Mar. 20,
1967, Ser. No. 624,625
Claims priority, application Switzerland, Feb. 11, 1964,
1,633/64
Int. Cl. A61k 27/00; C07c 103/34
U.S. Cl. 424—311                                10 Claims

ABSTRACT OF THE DISCLOSURE

The compounds are of the class of substituted phenoxy-acetic acid diethylamides which are useful as short-acting, quickly metabolized anesthetic agents. An illustrative embodiment is 2 - methoxy - 4 - (3'-acetoxy-propyl)phenoxy acetic acid diethylamide.

DETAILED DISCLOSURE

This application is a continuation of Ser. No. 431,214, filed Feb. 8, 1965, now abandoned.

The present invention concerns new aryloxyacetic acid amides, as well as processes for the production of these compounds which are valuable pharmaceuticals and intermediate products for the production thereof.

More in particular, this invention concerns, in a first aspect thereof, novel short-acting, quickly metabolized anesthetic agents which are especially well suited for administration in the form of solutions for intravenous injection, in a very short time, with good vein compatibility.

Short-acting, quickly metabolized, intravenously applied anesthetics should possess certain properties in order to be practically useful. Among these properties must be a sufficently high activity to permit achievement of a narcosis of stage IV with a dose of less than 50 mg./kg. of body weight applied to test animals such as rabbits. This means that the active ingredient can be administered to a patient in the form of injection solutions containing not more than 5% by weight of the active substance, and that the amount of such solution that must be administered to obtain the desired anesthetic effect does not exceed a volume of 20 millilitres. Active substances which must be administered in larger volumes and/or in higher concentrations are not permissible because they lead to venous irritation and cannot be administered in the short time, e.g. a fraction of a minute, which is necessary to achieve a quick, sufficiently deep narcosis.

Esters of acetic acid and N,N-disubstituted 2-methoxy-4-hydroxymethyl-phenoxyacetic acid amides are not of sufficient activity to permit preparation of injection solutions fulfilling the above medical requirements, and certain homologous esters of acetic acid and N,N-disubstituted 2 - methoxy-4-(2'-hydroxy-ethyl)-phenoxyacetic acid amides cause convulsions and other undesirable side effects and possess such high toxicity that they can not be used as anesthetics.

We have now found that, unexpectedly, a narrow group of esters of acetic acid with certain N,N-disubstituted 2-alkoxy-4-(3'-hydroxy-propyl)-phenoxyacetic acid amides and 2 - alkoxy-4-(3'-hydroxy-1'-propenyl)-phenoxyacetic acid amides are very satisfactory short acting anesthetics which lend themselves to the preparation of injection solutions fulfilling the above-described medical requirements.

The anesthetic agents according to the invention are, or contain as the anestically active ingredient, a compound of the formula

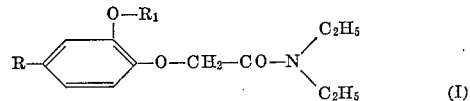
(I)

wherein R represents one of the radicals 3-acetoxy-propyl and 3-acetoxy-1-propenyl which correspond to the formulae $CH_3-CO-O-CH_2-CH_2-CH_2-$ and $$CH_3-CO-O-CH_2-CH=CH-$$

and R' represents methyl or ethyl, and can be used as short-acting anesthetics particularly for the treatment of simple and short but painful surgical operations on ambulant patients. They are administered preferably parenterally, in particular intravenously, as a dispersion or as solution in a mixture of water and a clinically acceptable solubility promoter.

These compounds are produced by acetylation of a hydroxyl compound of the formula

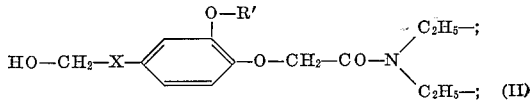
(II)

wherein X is the ethylene or vinylene radical, and R' has the same meaning as in Formula I. One way to obtain a compound of Formula I consists in esterifying a hydroxyl compound of Formula II with acetic acid. The reaction is performed, for example, in the presence of a catalyst such as, e.g. concentrated sulphuric acid, dry hydrogen chloride, phosphoric acid or p-toluene sulphonic acid, in excess acetic acid, or it is performed in the presence of a carbodiimide such as, e.g. dicyclohexyl- or di-p-tolyl- carbodiimide, and also in the presence of N,N'-carbonyl-di-imidazole in a solvent such as dry dioxan, tetrahydrofuran or dimethyl formamide. If, instead of the free acetic acid, a reactive functional derivative thereof such as a halide or acetanhydride is reacted with a hydroxyl compound of Formula II, then the reaction is preferably performed in the presence of an acid binding agent. Suitable acid binding agents are, e.g. pyridine and triethylamine—they can be used in an excess as solvents—or potassium carbonate in a solvent or diluent such as benzene, toluene or acetone.

Another variation of the process for the acetylation of hydroxyl compounds of general Formula II consists in reacting them with ketene or with a compound which liberates it, such as acetic acid isopropenyl ester, the reaction preferably being performed in the presence of a catalyst such as concentrated sulphuric acid, p-toluene sulphonic acid or sodium acetate, in a solvent or diluent such as acetone or dioxan.

If desired, a compound of general Formula I, wherein R is represented by the 3-acetoxy-1-propenyl radical, is reduced to the corresponding compound with the 3-acetoxy-propyl radical R. The reduction is performed, for example, by means of hydrogen in the presence of a catalyst such as Raney nickel, e.g. in a lower alkanol or dioxan, at a temperature of about 20–100° and under a pressure of about 1–100 atmospheres.

The starting compounds of general Formula II are also new compounds.

To produce a compound of Formula II, a substituted phenol of the formula

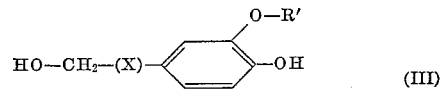
(III)

wherein X and R' have the meanings given above, is reacted in the presence of an acid binding agent, with a reactive ester of N,N-diethyl glycolamide such as N,N-diethyl chloroacetamide, N,N-diethyl bromacetamide or N,N-diethyl-2-p-tolylsulphonyloxyacetamide, or a salt of a phenol of Formula III, particularly an alkali metal salt, is reacted with one of the above named reactive esters of N,N-diethyl glycolamide. Suitable acid binding agents are, preferably, sodium hydroxide or a sodium alcoholate and, as solvent, a lower alkanol or a mixture of alkanol and water is suitable. Other suitable acid binding agents are sodium and potassium carbonate in acetone or another organic solvent. Also the sodium salts of the phenols of Formula III can be used as starting materials and, in this case, a solvent not containing hydroxyl groups such as benzene, toluene, xylene, or particularly, dimethyl formamide, is used.

Of the compounds of Formula II, 3-(3'-methoxy 4'-hydroxy-phenyl)-2-propen-1-ol (coniferyl alcohol) and 3-(3'-methoxy-4'-hydroxy-phenyl) - 1 - propanol (dihydroconiferyl alcohol) are known. The 3'-ethoxy-analogues are obtained analogously to procedures used for the preparation of the known 3'-methoxy-compounds.

As mentioned above, the new anesthetic agents falling under Formula I are administered, preferably, intravenously. The liquids for injetcion contain 1–5% of active substance, water, a solubilizing agent or emulsifying agent. The following compounds can be used as solubilizing or emulsifying agents: propylene glycol, sodium benzoate or the sodium salt of a hydroxybenzoic acid (analogously to the German Patent No. 1,091,288), water soluble salts of bile acids such as sodium dehydrocholate, morpholine desoxycholate, ethanolamine cholate, (analogously to German Patent No. 1,089,510), salts of α-naphthyl acetic acid with sodium or organic bases such as morpholine and diethanolamine (analogously to German Patent No. 1,147,055), as well as histamine and pyrogen free inositol phosphatide preparations and lecithin preparation having a low content of oil, optionally with partical glycerides of higher fatty acids such as mono- or di-olein, and/or their polyoxyethylene derivatives (analogously to U.S. Patent No. 3,044,931).

A dispersion of 1–5% of active substance, 10–25%, generally 15–20% of polyoxyethylene derivative of ricinoleic acid or of its glycerides, e.g. the commercial product Cremophor EL®, 5–15%, generally about 10%, of propylene glycol, 1–5%, generally about 2.5%, of poly-(N-vinyl-2-pyrrolidone), e.g. the commercial product Kollidon 25® of medium molecular weight of about 20,000 to 25,000, and optionally, up to about 1.5% of glucose, is particularly suitable.

Such a dispersion can be produced, for example, as follows:

(a) 2.5 g. of 2-methoxy-4-(3'-acetoxy-propyl)-phenoxyacetic acid diethylamide are dissolved, with slight heating, in a mixture of 15.0 g. of Cremophor EL®, (density 1.050–1.070 at 25° C., viscosity 550–850 cp. at 25° C., saponification number 56–66, hydroxyl number 57–80, manufactured by BASF, Ludwigshafen, Germany), and 10.0 g. of propylene glycol. 2.5 g. of Kollidon 25® (biologically tested poly-(N-vinyl-2-pyrrolidone)) and 1.5 g. of glucose are dissolved in 60 g. of distilled water. The two solutions are mixed and the volume is made up to 100 ml. with distilled water. After filtering through a glass filter G4, the solution is filled into colourless ampoules of 5 or 10 ml. and sterilised in an autoclave for 20 minutes at 120° and 1 atm. excess pressure. The solutions so produced contain 25 mg. of active substance per millilitre.

(b) A solution having the same content of active substance is obtained on using 15.0 g. of propylene glycol, 5.0 g. of Kollidon 25®; no glucose and the same amounts of the other components.

The following non-limitative examples illustrate the production of the new compounds of general Formula I, and of novel intermediate products. The temperatures are given in degrees centigrade. In these examples, "g." means "gram," "ml." means "millilitre," and "torr" means "mm. Hg."

EXAMPLE 1

(a) A solution of 22.8 g. of 3-(3'-methoxy-4'-hydroxyphenyl)-1-propanol (dihydroconiferyl alcohol) in 100 ml. of anhydrous ethanol is added to a solution of 2.9 g. of sodium in 100 ml. of anhydrous ethanol and the mixture is refluxed for 15 minutes. 0.5 g. of sodium iodide and 20.6 g. of chloroacetic acid diethylamide are added, the latter dropwise, and the whole is refluxed until the reaction of the mixture is neutral. After cooling to 20°, precipitated sodium chloride is filtered off and washed with ethanol and the filtrate is evaporated in vacuo. The residue is taken up in chloroform, washed with 2 N sodium hydroxide solution and water, dried over sodium sulfate and concentrated. Distillation of the residue under 0.009 torr yields 2-methoxy - 4 - (3'-hydroxypropyl)-phenoxyacetic acid diethylamide which boils at 218–223° under this pressure.

(b) A solution of 15 g. of 2-methoxy-4-(3'-hydroxypropyl)-phenoxyacetic acid diethylamide in 15 ml. of pyridine and 15 ml. of acetic acid anhydride is left standing for 48 hours at 20° after which it is evaporated at 60° under 12 torr. 24 ml. of saturated, aqueous sodium carbonate solution are added to the residue, the mixture is extracted with diethyl ether, the ethereal solution is washed with saturated sodium chloride solution, dried over sodium sulfate and evaporated in vacuo. Distillation of the residue at 0.002 torr yields 2-methoxy-4-(3'-acetoxypropyl)-phenoxyacetic acid diethylamide, which boils at 180–187° under this pressure. $n_D^{20°}$ 1.5155.

(c) From 22.6 g. of 3-(3'-methoxy-4'-hydroxyphenyl)-2-propen-1-ol (coniferyl alcohol) 2-methoxy-4-(3'-hydroxy-1'-propenyl)-phenoxyacetic acid diethylamide, B.P. 213°/0.005 torr is obtained analogously to (a), and therefrom 2-methoxy - 4 - (3'-acetoxy-1'-propenyl)-phenoxyacetic acid diethylamide, B.P. 176–177°/0.002 torr, $n_D^{25°}$ 1.5448, is produced analogously to (b).

EXAMPLE 2

(a) 166.2 g. of 3-hydroxy - 4 - ethoxy-benzaldehyde (bourbonal) and 230 g. of malonic acid are dissolved as well as possible by heating gently in 500 ml. of pyridine, 12 ml. of piperidine are added to the mixture and the whole is gently stirred for 3 hours at room temperature. It is then heated for about 2 hours on a steam bath until the development of carbon dioxide decreases. The reaction mixture is then poured into a mixture of 1 kg. of ice and 600 ml. of concentrated sulfuric acid whereupon the reaction product gradually crystallizes. After standing for 1 hour at 0°, the reaction product is filtered off under suction and washed three times with 120 ml. of cold water each time. The filter cake is dissolved in 250 ml. of acetone and 150 ml. of water, the solution is filtered, 400 ml. of water are added and the whole is kept for 15 hours at 0°. The 3-hydroxy-4-ethoxy-cinnamic acid which crystallizes out is filtered off under suction, washed with cold water and dried for 5 hours at 80° under 11 torr, M.P. 156–157°.

(b) 104 g. of 3-ethoxy-4-hydroxycinnamic acid are dissolved, while gently heating, in 520 ml. of anhydrous ethanol, the solution is saturated with dry gaseous hydrogen chloride, then refluxed for 5 hours and then evaporated in vacuo. The residue is taken up in diethyl ether, the ethereal solution is washed with saturated sodium hydrogen carbonate solution and with water, dried over sodium sulfate and evaporated in vacuo. Distillation of the residue under 0.01 torr, yields 3-ethoxy-4-hydroxycinnamic acid ethyl ester which boils at 180–185° under this pressure. It solidifies into crystals which melt at 54–56°.

(c) 44.8 g. of 3-ethoxy-4-hydroxycinnamic acid ethyl ester are dissolved in 500 ml. of anhydrous ethanol and the solution is hydrogenated at 20° under atmospheric pressure with hydrogen in the presence of palladium charcoal until no more hydrogen is taken up. The catalyst is filtered off under suction and washed with ethanol. The filtrate is evaporated in vacuo. The residue is recrystallized from diethylether/pentane whereupon 3-ethoxy-4-hydroxy-hydrocinnamic acid ethyl ester is obtained which melts at 38–39.5°.

(d) A solution of 29.2 g. of 3-ethoxy-4-hydroxy-hydrocinnamic acid ethyl ester in 50 ml. of anhydrous diethyl ether is added dropwise while vibrating well to a suspension of 9.3 g. of lithium aluminium hydride in 150 ml. of anhydrous diethyl ether, the addition being so made that the reaction mixture lightly boils. On completion of the dropwise addition, the reaction mixture is refluxed for another 3 hours while cooling with ice and vibrating well. 100 ml. of diethyl ether are then added after which carbon dioxide is introduced until saturation is reached. The ethereal phase is separated, the aqueous phase is extracted with ethyl acetate, the combined organic phases are washed with saturated sodium chloride solution, dried over sodium sulfate and evaporated in vacuo. The residue is recrystallized from diethyl ether/pentane; the 3-(3'-ethoxy-4'-hydroxyphenyl)-propane-1-ol obtained melts at 63–64°.

(e) 2-ethoxy-4-(3'-hydroxypropyl)-phenoxyacetic acid diethylamide, B.P. 215°/0.06 torr, is produced from the phenyl propanol derivative obtained according to (d) analogously to (1a) with chloroacetic acid diethylamide.

(f) 2-ethoxy-4-(3' - acetoxypropyl)-phenoxyacetic acid diethylamide, B.P. 200–207°/0.02 torr, $n_D^{20°}$ 1.5114, is obtained analogously to (1b) from the 2-ethoxy-4-(3'-hydroxypropyl)-phenoxyacetic acid diethylamide prepared according to (d).

EXAMPLE 3

(a) 29.0 g. of 3-ethoxy-4-hydroxycinnamic acid ethyl ester, obtained according to Example 1b, are reduced analogously to Example 2d, to 3-(3'-ethoxy-4'-hydroxyphenyl)-2-propen-1-ol.

(b) 2 - ethoxy - 4 - (3'-hydroxy-1'-propenyl)-phenoxyacetic acid diethylamide is produced from the reaction product of (a) analogously to Example 1a with chloroacetic acid diethylamide.

(c) From the reaction product of (b), 2-ethoxy-4-(3'-acetoxy-1'-propenyl)-phenoxyacetic acid diethylamide is obtained by acetylation analogously to Example 1b.

What is claimed is:

1. A therapeutical composition in dosage unit form comprising
(1) an amount of 1 to 5% of a compound of the formula

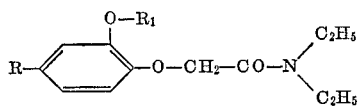

wherein:
R is 3-acetoxy-propyl or 3-acetoxy-1-propenyl, and
(2) an effective amount of pharmaceutically acceptable solubilizing agent, and
(3) a liquid pharmaceutically acceptable carrier;
wherein said solubilizing agent and said liquid carrier comprise
(a) 10–25% of polyoxyethylene derivative of ricinoleic acid or of its glycerides,
(b) 5–15% of propylene glycol,
(c) 1–5% of poly-(N-vinyl-2-pyrrolidone) of medium molecular weight,
(d) 0–1.5% of glucose, and
(e) distilled water.

2. A therapeutical composition as defined in claim 1 wherein said compound is 2-methoxy-4-(3'-acetoxy-propyl)-phenoxy-acetic acid, diethylamide.

3. A therapeutical composition as defined in claim 1 wherein said compound is 2-ethoxy-4-(3'-acetoxy-propyl)-phenoxy-acetic acid diethylamide.

4. A therapeutical composition as defined in claim 1 wherein said compound is 2-methoxy-4-(3'-acetoxy-1'-propenyl)-phenoxyacetic acid diethylamide.

5. A therapeutical composition as defined in claim 1 wherein said compound is 2-ethoxy-4-(3'-acetoxy-1'-propenyl)-phenoxyacetic acid diethylamide.

6. A process for producing an anesthetic effect in a mammal which comprises intravenously administering to said mammal an effective amount of a compound of the formula

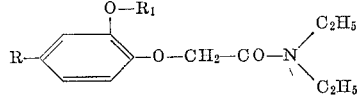

wherein:
R is 3-acetoxy-propyl or 3-acetoxy-1-propenyl, and
R' is methyl or ethyl.

7. A process as claimed in claim 6 wherein said compound is 2-methoxy-4-(3'-acetoxy-propyl)-phenoxy-acetic acid diethylamide.

8. A process as claimed in claim 6 wherein said compound is 2-ethoxy-4-(3'-acetoxy-propyl)-phenoxy-acetic acid diethylamide.

9. A process as claimed in claim 6 wherein said compound is 2-methoxy-4-(3'-acetoxy-1'-propenyl)-phenoxy-acetic acid diethylamide.

10. A process as claimed in claim 6 wherein said compound is 2-ethoxy-4-(3'-acetoxy-1'-propyl)-phenoxy-acetic acid diethylamide.

References Cited

UNITED STATES PATENTS 3,012,936  12/1961  Stoll.

ALBERT T. MEYERS, Primary Examiner
JEROME D. GOLDBERG, Assistant Examiner